March 14, 1961  J. LERNER ET AL  2,974,526
COMPENSATING CAPACITOR FOR LIQUID LEVEL MEASUREMENT
Filed Feb. 11, 1959  2 Sheets-Sheet 1
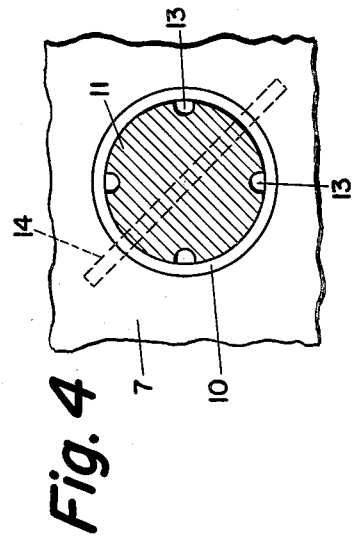
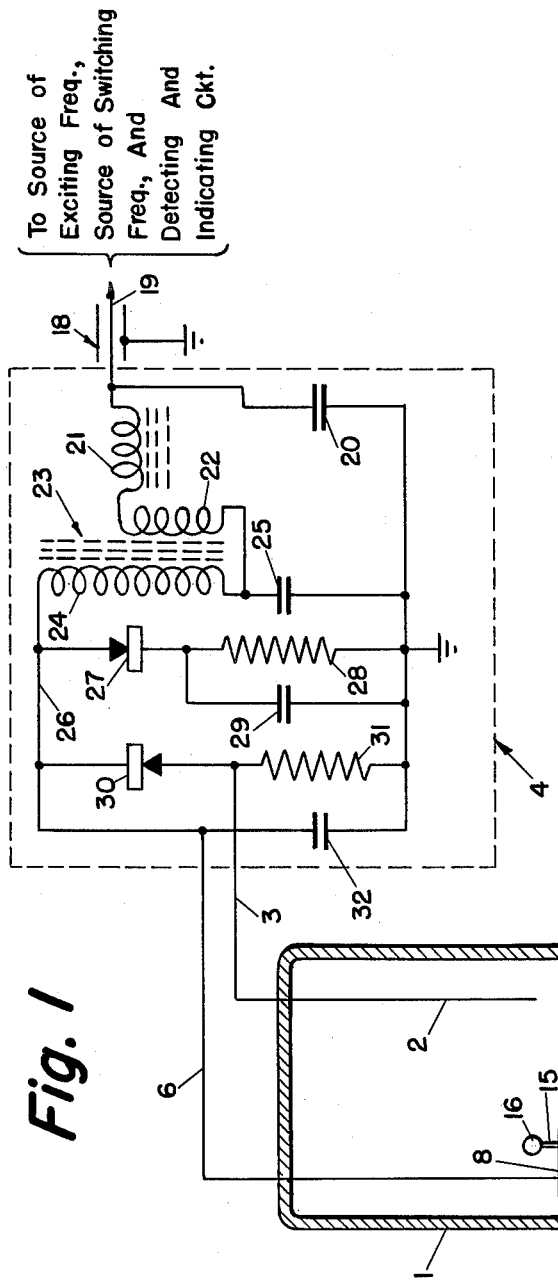
INVENTORS
JULIUS LERNER
HENRY L. BACHOFER
BY
Robert O. Spindle
ATTORNEY March 14, 1961 J. LERNER ET AL 2,974,526
COMPENSATING CAPACITOR FOR LIQUID LEVEL MEASUREMENT
Filed Feb. 11, 1959 2 Sheets-Sheet 2
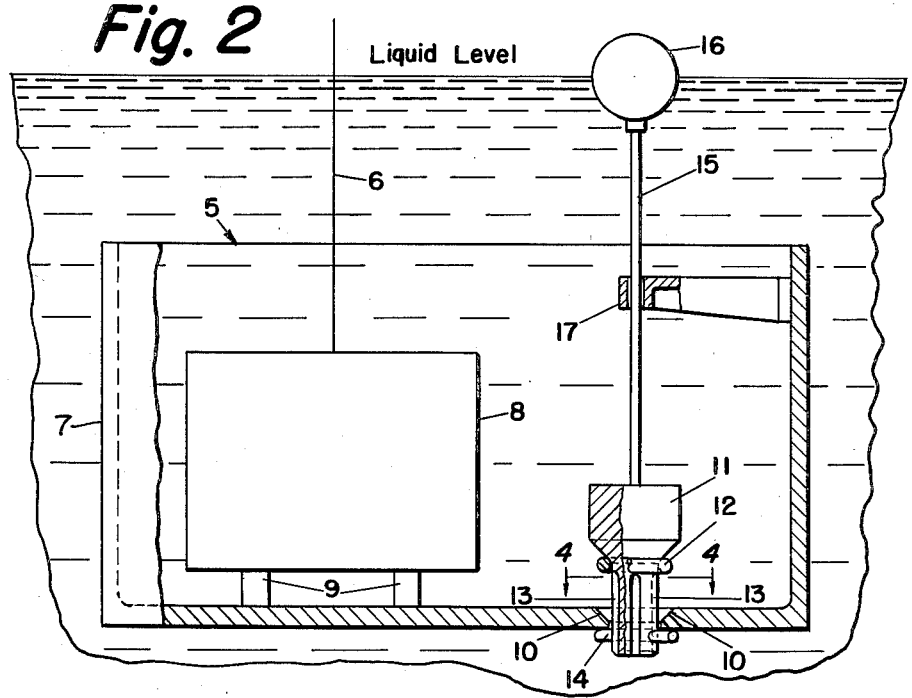
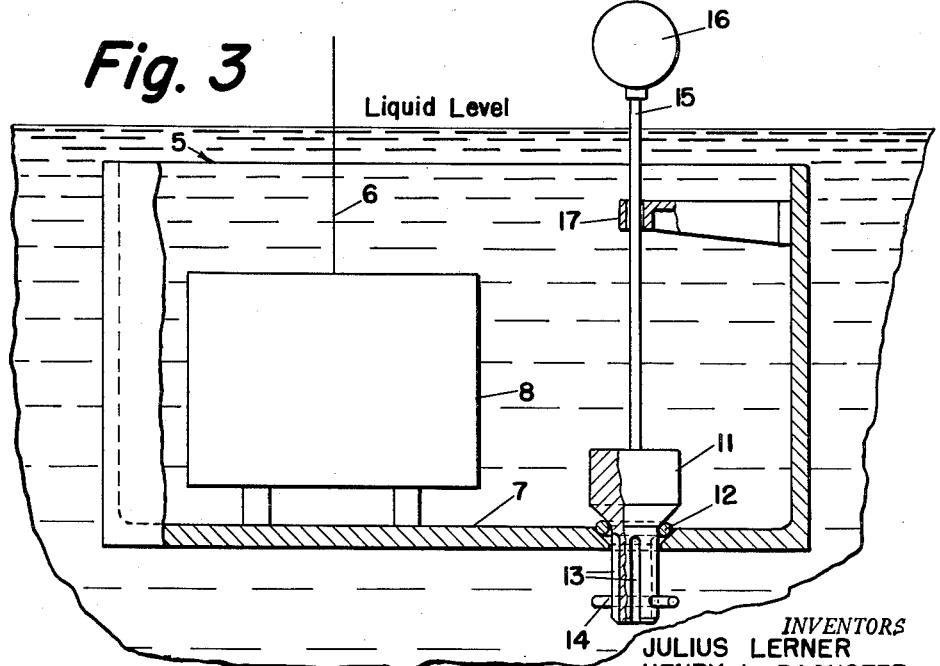
INVENTORS
JULIUS LERNER
HENRY L. BACHOFER
BY
ATTORNEY

United States Patent Office 2,974,526
Patented Mar. 14, 1961

2,974,526

COMPENSATING CAPACITOR FOR LIQUID LEVEL MEASUREMENT

Julius Lerner, Drexel Hill, and Henry L. Bachofer, Newtown Square, Pa., assignors to Sun Oil Company, Philadelphia, Pa., a corporation of New Jersey Filed Feb. 11, 1959, Ser. No. 792,532

6 Claims. (Cl. 73—304)

This invention relates to the measurement or gauging of liquid level in tanks, and more particularly to an improved compensating capacitor arrangement for use in liquid level measurement systems.

At present, one electrical method of gauging the liquid level in vessels such as tanks is by means of a capacitive-type liquid level measurement system, comprising a capacitive probe and related circuitry. A system of this type is disclosed in the co-pending Shawhan application, Serial No. 759,884, filed September 9, 1958. The probe utilized in such a system is ordinarily an elongated stationary probe hung in the vessel (tank) and adapted to have its effective capacitance with respect to ground changed or varied in a smooth, continuous manner as the liquid level rises or falls in the tank. Such a probe may be termed a "proportional" probe, since the capacitance to ground presented by the probe to an external circuit will be more or less proportional to the liquid level in the tank.

A problem arises in connection with this method of liquid level measurement in tanks such as oil blending tanks, wherein the composition of the blend may change from time to time. The change in the dielectric constant of the liquid, with a change in the oil being blended, causes a change in the calibration of the instrument, since the dielectric constant of the dielectric is one of the factors which determine the capacitance of a capacitor.

One method used to overcome this problem is to place a capacitor of known geometry near the bottom of the vessel, below the bottom of the measuring probe, in such a position that the plates of this capacitor are intended to be covered by the dielectric liquid, even when the liquid level is at the bottom of the measuring probe. This "bottom" capacitor is connected into the circuit in such a way as to serve as a compensating capacitor, to automatically compensate for changes in the dielectric constant of the liquid. Such an arrangement is disclosed in the aforementioned application.

The method set forth in the preceding paragraph, i.e. the utilization of a compensating capacitor, eliminates the change in calibration of the instrument (which would otherwise result from a change in dielectric constant, as previously described), but has one undesirable feature, which will now be explained. Let us consider a capacitive-type liquid level measurement system that indicates the level in the vessel on a meter which is connected to the external impedance measurement circuitry. As the vessel starts to be emptied from a full condition, the meter reads "full." As the liquid level in the vessel drops, the meter reading decreases. When the liquid level reaches the bottom of the capacitive measuring probe, the meter reads "empty" or "zero." This is very well, and clear to the operator; the latter knows that there is a fixed amount or level of liquid in the tank when the meter reads "zero." However, as the tank is drained further, the compensating capacitor is uncovered, so that its capacitance varies from its desirable, fixed value. This last-mentioned variation of capacitance, applied to the circuit connected to the meter, will ordinarily cause the meter pointer to travel up scale, toward the "full" mark, since the variation of capacitance of the compensating capacitor in effect changes the calibration or sensitivity of the measuring system. When the compensating capacitor is completely uncovered, the meter indication may be close to "full," or it may even be right at "full"; this indication is of course false since actually the vessel is then substantially completely empty.

An object of this invention is to provide a novel compensating capacitor arrangement for a capacitive-type liquid level measurement system.

Another object is to provide a compensating capacitor arrangement, in a liquid level measurement system, which prevents a false "full" indication from being given.

The objects of this invention are accomplished briefly, in the following manner: A measuring probe and a compensating capacitor are both mounted in the vessel wherein a liquid level measurement is desired to be made, the compensating capacitor being mounted near the bottom of the vessel and below the bottom of the probe. A liquid-tight open trough is mounted in the vessel, this trough surrounding the capacitor and being of a size such that the upper ends of its side walls are located somewhat above the top of the compensating capacitor. An aperture is proved in the bottom wall of the trough, and a float-actuated valve arrangement is arranged to cooperate with this aperture in such a way that the aperture is closed off when the liquid in the vessel falls to a predetermined level somewhat above the top of the trough, but is opened when the liquid rises above this predetermined level.

A detailed description of the invention follows, taken in conjunction with the accompanying drawings, wherein:

Figure 1 is a sectional view, somewhat diagrammatic, illustrating a capacitive-type liquid level measurement system according to this invention, installed in an oil blending tank;

Figures 2 and 3 are similar sections through the compensating capacitor assembly, each showing the position assumed by the parts in response to a respective different liquid level in the tank; and Figure 4 is a section taken on line 4—4 of Figure 2.

Referring first to Figure 1, a vessel 1, for example an oil blending tank, has located therein a capacitive-type measuring probe 2. For a permanent installation, the probe 2 is fastened to the interior wall of the vessel 1 by any suitable means (not shown); this keeps the probe in a desired position. Probe 2 extends from the top of tank 1 down to a point near the bottom of the tank. The arrangement is such that the liquid dielectric such as oil in tank 1 is effectively electrically coupled to the probe 2, and as the liquid rises and falls, the effective capacitance to ground of probe 2 is varied proportionately. Thus, by measuring the electrical capacitance to ground of this probe by means of a suitable circuit, the level of the liquid in vessel 1 may be measured. The "level" probe or measuring probe 2 is electrically connected by means of a suitable cable or wire 3 to electrical coupling circuitry contained in an electronic unit 4 which is positioned outside of the vessel or tank 1 but closely adjacent thereto. A more detailed description of the circuitry in unit 4 will be given hereinafter.

A compensating capacitor assembly 5 is also located in the vessel 1, near the bottom of the vessel and below the bottom of probe 2, as illustrated in Figure 1. The assembly 5 is constructed in accordance with the invention, and will be described more in detail hereinafter. For a permanent installation, the compensating capacitor assembly 5 is preferably fastened to the interior wall of the vessel 1 by any suitable means (not shown), so as to keep this assembly in position in the vessel. A suitable cable or wire 6 is used to electrically connect the compensating capacitor in assembly 5 to the electronic unit 4.

The measuring probe 2 may comprise any suitable elongated electrical conductor whose capacitance (to ground, or to the metallic wall of the vessel 1) is subject to control by a dielectric liquid coming adjacent thereto. Thus, it may comprise a bare wire, or a wire covered with a "shroud" of insulating material (which latter would be the type of probe utilized when the liquid whose level to be measured is a conducting liquid, rather than an insulating or dielectric liquid), or it may even be a piece of "twin lead" of the type commonly used for television antenna lead-ins; when using such "twin lead," a large part but not all of the insulating web separating the two conductors would be removed. Alternatively, the (capacitive) measuring probe 2 may be constituted by a (grounded) tube positioned in the vessel 1 (the tube thus being immersed in the liquid and arranged to receive the same), with a second plate of the capacitor constituted by a rod or wire extending axially through the tube. It will be evident that an arrangement of this type will provide a capacitance which will vary due to changes of liquid level which provide changes in the amount of dielectric, other than air or gas, between the capacitor elements constituted by the tube and the central conductor or electrode. For simplicity, the grounded plate of the capacitor (e.g., a tube or a second wire) is omitted from the showing in Figure 1, only the ungrounded plate being shown as a measuring probe 2. Correspondingly, wire 3 is shown as a single wire, although this may actually comprise a coaxial cable with the outer conductor grounded.

The compensating capacitor proper, included in the assembly 5, should be of such a design as to be self-draining, for example vertical, parallel plates one of which is grounded. The arrangement is such (as will be further described hereinafter) that the liquid in vessel 1 enters the space between the plates of this capacitor; as the dielectric constant of such liquid changes, the capacitance of this compensating capacitor will of course change accordingly.

The compensating capacitor referred to is made to be at all times completely filled with the liquid and subject to the changes of composition (and therefore of dielectric constant) previously referred to, such changes being produced, for example, when the composition of the blend in the oil blending tank changes. Accordingly, a variation of the capacitance of probe 2 with respect to that of the compensating capacitor would be dependent essentially solely upon the liquid level in vessel 1. For simplicity, only a single wire is shown at 6, although this may actually comprise a coaxial cable with the outer conductor grounded.

Figure 2 is a section, on an enlarged scale, through the compensating capacitor assembly 5 of this invention, the parts being illustrated in the positions assumed by them when the liquid (oil) level is even with or above the bottom of measuring probe 2. The outer shell 7 of assembly 5 is an open-topped, liquid-tight container, which may be termed a liquid-tight open trough. This trough entirely surrounds the sides and bottom of the compensating capacitor 8, and the side walls of the trough 7 extend to a plane somewhat above that of the top of the capacitor 8. As previously stated, the capacitor 8 is an arrangement of vertical, parallel plates between adjacent ones of which the liquid to be measured can enter. This arrangement of plates has a desirable self-draining feature, such that when flushing of the trough or container 7 occurs (as described hereinafter), the liquid between the capacitor plates can easily change. As previously described, when assembly 5 is in position in vessel 1 the upper ends of the side walls of trough 7 lie in a plane somewhat below the lower end or bottom of probe 2.

The capacitor 8 itself (illustrated as a box-like assembly of plates) is mounted in trough 7 with the bottom of such capacitor located somewhat above the bottom of the trough. This mounting may be accomplished by means of suitable brackets or supports 9 which are secured to capacitor 8 and to the bottom inner wall of trough 7. The cable 6 is connected to capacitor 8 and electrically connects the same to electronic unit 4 outside the vessel.

The bottom wall of trough 7 has an aperture 10 therein, this aperture being of non-uniform diameter (e.g., it may be frusto-conical) and being adapted to act as the seat of a valve. A tapered plug 11 is mounted to move up and down in aperture 10. The upper portion of plug 11 carries an O-ring 12 which is adapted to seat in aperture 10 and seal the same, when plug 11 moves downwardly sufficiently for the O-ring to engage the wall of aperture 10. It will be noted that in Figure 2, the plug 11 is in its uppermost position, wherein O-ring 12 is considerably above aperture 10, in non-sealing position.

Below O-ring 12, plug 11 has a plurality (e.g., four in number, see Figure 4) of longitudinal slots 13 milled therein, each of these slots extending from a point just below O-ring 12 to the bottom of the plug. Thus, when plug 11 is in any position above its lowermost position (in which latter position O-ring 12 is seated in aperture 10), the liquid has a free drainage path through slots 13 and aperture 10, out of trough 7. A stop 14, which may for example be in the form of an elongated transverse pin secured to the bottom of plug 11, engages the lower bottom wall of trough 7 in the Figure 2 position (uppermost position of plug 11) and limits the upward movement of plug 11.

A rod 15 is fastened to the upper end of plug 11, and the upper end of this rod is secured to a float 16, which may for example be a hollow metallic float of the type commonly used in flush tanks. A guide 17, suitably secured to one of the side (vertical) walls of trough 7, surrounds the central portion of rod 15.

Figure 2, as previously stated, shows the compensating capacitor assembly with the parts in the position assumed by them when the liquid (oil) is as illustrated, that is, when the liquid level is even with or higher than the bottom of measuring probe 2. In this connection, it is again pointed out that the bottom of probe 2 is located considerably above the top of trough 7. When float 16 is raised by the liquid in vessel 1, it pulls upwardly on rod 15, raising plug 11 to its uppermost position, illustrated in Figure 2. Plug 11 is held in this same position (by means of float 16) when the liquid level in the vessel is anywhere above the level illustrated in Figure 2. In this position of the plug, the valve at the bottom of trough 7 is open, and the liquid in this trough is free to drain through slots 13 and aperture 10 to vessel 1. As stated, stop 14 keeps plug 11 from being raised too far.

When the liquid in vessel 1 drops below the level shown in Figure 2, the float 16 follows it down, so that the float begins to drop also. With continued falling liquid level in tank 1, float 16 follows this level change down. This makes rod 15 and plug 11 also follow this level change downwardly. At some liquid level somewhat above that illustrated in Figure 3, and before the liquid level reaches the upper end of the side walls of trough 7, the parts assume the position illustrated in Figure 3. In this lowermost position of plug 11, O-ring 12 seats in aperture 10, closing the valve arrangement and stopping the flow of liquid out of trough 7.

No matter how much more the liquid level in vessel 1 drops, the trough 7 will remain filled with liquid. Thus, uncovering of the capacitor 8 is prevented, and the plates of such capacitor will remain covered with liquid. Then, compensating capacitor 8 will always have the desired fixed capacitance value, and any undesirable effects which might arise were capacitor 8 to become uncovered (such as a false "full" indication, for example) will be prevented from occurring.

Upon filling the vessel 1 with a new material, the parts of assembly 5 will remain as illustrated in Figure 3 until the liquid level in the vessel rises high enough to raise float 16. Float 16, through rod 15, then raises valve plug 11, and the liquid (oil) in trough 7 is swept out or flushed out by the flowing of the new liquid through slots 13, and the mixing of the liquid in vessel 1.

It is important that the volume of liquid remaining in trough 7 when aperture 10 is closed be kept to a minimum, so that when it is mixed with the new liquid (new blend of oil) it will not contaminate the new liquid. Any contamination is minimized in actual practice, since in most cases similar blends, of almost the same composition, are made up in a given tank.

Referring again to Figure 1, this figure illustrates the details of typical circuitry which can be used in the electronic unit 4. This circuitry corresponds closely to that disclosed in the aforementioned Shawhan application. A coaxial cable 18, whose sheath or outer conductor is grounded, supplies, by means of its center conductor 19, exciting and switching voltages (derived from suitable corresponding sources) to electronic unit 4. These sources, as well as a detecting and indicating circuit (to which cable 18 is also connected) are preferably all located at a remote recording point, as described in the aforementioned application.

As described, the coaxial cable 18 extends from the apparatus at the recording point to electronic unit 4, and thence to the probe and capacitor devices at the tank or vessel 1, in which the liquid level is to be measured. This coaxial cable may be of very considerable length.

The central conductor 19 of cable 18 may, if required by the constants of the system, be connected to the grounded sheath thereof through a capacitor 20. It is also connected through a toroidal coil 21 (which may, for example, have an inductance value of 2.5 millihenries) to the smaller winding 22 of a transformer 23 having the larger winding 24 connected as illustrated to the smaller winding providing an autotransformer. The common connection of the two windings is coupled to ground by way of the capacitor 25. The unconnected end of winding 24 is connected to the line 26. Between this line and ground a diode 27 is connected in series with the parallel arrangement of a resistor 28 and a reference capacitor 29. Also connected between the line 26 and ground is a diode 30 in series with the parallel arrangement of a resistor 31 and the capacitance to ground of the measuring probe 2, which latter is connected by means of cable 3 to the ungrounded end of resistor 31. It will be noted that the diodes 27 and 30 are oppositely poled with respect to the line 26 and ground.

Also connected between the line 26 and ground is a fixed capacitor 32. Also connected to line 26 is the cable 6 extending to the ungrounded plate or plates of the compensating canpacitor 8; thus, the capacitance of such compensating capacitor is connected in parallel with capacitor 32. As previously described, the compensating capacitor 8 is always covered by the liquid whose level is to be measured. The capacitance of this compensating capacitor varies with the dielectric constant of the liquid undergoing measurement.

As indicated by the dotted-line block for electronic unit 4, all of the circuit components 20 through 32 are located in a common container, or on a common chassis. The remainder of the electronic circuitry (e.g., the exciting frequency source, the switching frequency source, and the detecting and indicating circuit) may be located at a remote or recording point, as stated, while the measuring probe 2 and the compensating capacitor assembly 5 are of course mounted in the vessel 1.

As explained in detail in the aforementioned application, the system preferably includes a switching frequency source so constructed and arranged as to apply direct potentials of successively opposite signs to diodes 27 and 30. When a positive potential with respect to ground is applied to line 26, diode 27 is rendered conductive and diode non-conductive. This situation is reversed when a potential of opposite sign is applied to line 26. The result, accordingly, is that during the application of one polarity of the switching voltage, capacitor 29 will be effectively in the circuit while the capacitor provided by the measuring probe 2 will be out of the circuit. This condition is reversed during the next succeeding application of direct potential. The capacitors 32 and 8 will always be in the circuit.

It may be seen, from the above, that the result is a switching action in which on alternate half cycles of the switching frequency the capacitances at 2 and 29 are effective in determining the high frequency signal component appearing on conductor 19. It will now be evident that the difference between the high frequency components produced during the successive half cycles will be substantially solely dependent upon the difference between the capacitances 2 and 29. It may be assumed that the circuit including capacitor 29 is switched by conductivity of its diode 27 into the circuit during the application of the positive switching potential and, consequently, the high frequency component of the signal on conductor 19 during ths time represents the effect of the capacitance 29. Similarly, the amplitude of the high frequency component on conductor 19 during the application of the negative switching potential corresponds to the effect of the capacitance 2.

The detecting and indicating circuit (not shown) connected to conductor 19 functions to measure the difference in amplitudes of the positive and negative intervals' high frequency components. This difference in amplitudes results from the switching action and the difference in capacitances at 2 and 29. It may thus be stated that the detecting and indicating circuit operates to indicate the difference in the capacitances at 2 and 29, that is, the difference between the capacitance 2 to be measured and the capacitance of the fixed reference capacitor 29.

By the choice of fixed capacitances at 20, 25, and 32 in conjunction with proper inductances at 21, 22, and 24, the variations of the impedance presented at the remote terminal of the coaxial line 18 may be maintained in a linear region through the changes of capacitance involved in the changes of liquid level in the tank and the expected changes of the dielectric constant of the liquid. The capacitance at 29 is chosen to be almost equal to but slightly smaller than C', which latter represents the capacitance of the probe 2 and lead 3 with the vessel 1 empty.

During the intervals when diode 27 is conductive and diode 30 is cut off, provided that a feedback arrangement for the control of amplitude of oscillations is used as described in the aforementioned application, a voltage appears on lead 19 which is proportional to the capacitance of capacitor 29, plus the capacitance which would exist between the plates of compensating capacitor 8 with the liquid absent, plus the capacitance of lead 6, plus the dielectric constant $k$ minus 1 times the capacitance of the plates of 8 with the liquid absent, plus the capacitance of capacitor 32, minus $C_1$ (to be later defined).

During the intervals when diode 30 is conductive and diode 27 cut off, a voltage appears on lead 19 which is proportional to C', plus $k$ minus 1 times the depth of immersion of probe 2 (measure of liquid level) times the capacitance of probe 2 per unit length with air as dielectric, plus the capacitance which would exist between the plates of compensating capacitor 8 with the liquid absent, plus the capacitance of lead 6, plus $k$ minus 1 times the capacitance of the plates of 8 with the liquid absent, plus the capacitance of capacitor 32, minus $C_1$.

The fixed capacitor 32 can be chosen so that the capacitance at 29, plus the capacitance which would exist between the plates of capacitor 8 with the liquid absent, plus the capacitance of lead 6, plus the capacitance at 32, equals $C_1$. Recall that the capacitance at 29 was made approximately equal to $C'$. The voltage measured by the indicating circuit is the difference of the two voltages developed respectively when diode 27 is conductive (diode 30 cut off) and when diode 30 is conductive (diode 27 cut off). Since the capacitance of probe 2 per unit length with air as dielectric is constant and since the $(k-1)$ factor is a constant (as explained in the aforementioned application), the measured voltage is directly proportional to the depth of immersion of probe 2. Thus, the measured voltage is linearly proportional to the liquid level being measured, and independent of its dielectric constant.

It is desired to be pointed out that the above analysis assumes that the compensating capacitor 8 is always covered with the liquid being measured, and thus has a fixed capacitance value. Were this capacitor to become uncovered, it would vary from its fixed, desired capacitance value; then, the sensitivity of the entire system would vary, due to the change in oscillator (exciting frequency source) amplitude resulting from the change in the capacitance which is coupled to the oscillator output. This change in system sensitivity corresponds to an anomalous capacitance variation and results in a false or erroneous liquid level indication. However, with the compensating capacitor arrangement of this invention, the compensating capacitor is kept covered with liquid at all times (even when the vessel is completely drained); thus, the compensating capacitor 8 is maintained at its desired constant capacitance value, and any false liquid level indication is prevented from occurring.

The following is presented by way of a summary, relative to the advantages offered by the invention. First, the system of this invention utilizes a compensating capacitor which is covered at all times with the particular liquid whose level is then being measured; this capacitor has a capacitance which depends upon, and is proportional to, the dielectric constant of the liquid. Thus, the system will automatically adjust the capacitance of the compensating capacitor so that liquid level measurements can be made in vessels handling liquids of varying dielectric constants. Second, the use of a compensating capacitor connected in the manner disclosed eliminates the need for making a manual "span" adjustment at the electronic chassis (which adjustment was necessary in prior systems to accommodate liquids of varying dielectric constants). This means that a possible source of error (a wrong manual adjustment) is eliminated. Third, according to this invention the compensating capacitor is automatically kept covered with liquid at all times, even when the vessel is empty; thus, the invention eliminates the (false) "full" level indication which would otherwise be given when the tank is empty.

The invention claimed is:

1. In a capacitive-type liquid level measurement system for vessels, a compensating capacitor located in the vessel, a liquid-tight open topped trough surrounding said capacitor, the bottom wall of said trough having an aperture therein but being otherwise imperforate; and means actuated by the liquid in said vessel for sealing said aperture when the liquid in said vessel drops to a predetermined level above the top of said trough, thereby to maintain liquid in said trough and covering said capacitor even when the level of liquid in said vessel falls below the top of said trough.

2. In a capacitive-type liquid level measurement system for vessels, a compensating capacitor located in the vessel, a liquid-tight open topped trough surrounding said capacitor, the bottom wall of said trough having an aperture therein but being otherwise imperforate; a liquid-level-responsive float-actuated member for sealing said aperture when the liquid in said vessel drops to a predetermined level above the top of said trough, thereby to maintain liquid in said trough and covering said capacitor even when the level of liquid in said vessel falls below the top of said trough.

3. A capacitive-type liquid level measurement system for vessels comprising a measuring probe and a compensating capacitor both located in the vessel, means connecting both said probe and said capacitor into a common indicating circuit, a liquid-tight open topped trough surrounding said capacitor, the bottom wall of said trough having an aperture therein but being otherwise imperforate; and means actuated by the liquid in said vessel for sealing said aperture when the liquid in said vessel drops to a predetermined level above the top of said trough.

4. A capacitive-type liquid level measurement system for vessels comprising a measuring probe and a compensating capacitor both located in the vessel with said capacitor positioned near the bottom of said vessel and below the bottom of said probe, means connecting both said probe and said capacitor into a common indicating circuit, a liquid-tight open topped trough surrounding said capacitor, the bottom wall of said trough having an aperture therein but being otherwise imperforate; and means actuated by the liquid in said vessel for sealing said aperture when the liquid in said vessel drops to a predetermined level above the top of said trough.

5. A capacitive-type liquid level measurement system for vessels comprising a measuring probe and a compensating capacitor both located in the vessel, means connecting both said probe and said capacitor into a common indicating circuit, a liquid-tight open topped trough surrounding said capacitor, the bottom wall of said trough having an aperture therein but being otherwise imperforate; and a liquid-level-responsive float-actuated member for sealing said aperture when the liquid in said vessel drops to a predetermined level above the top of said trough.

6. A capacitive-type liquid level measurement system for vessels comprising a measuring probe and a compensating capacitor both located in the vessel with said capacitor positioned near the bottom of said vessel and below the bottom of said probe, means connecting both said probe and said capacitor into a common indicating circuit in such a way that an erroneous indication would be given were said capacitor to become uncovered, a liquid-tight open topped trough surrounding said capacitor, the bottom wall of said trough having an aperture therein but being otherwise imperforated; and a liquid-level-responsive float-actuated member for sealing said aperture when the liquid in said vessel drops to a predetermined level above the top of said trough.

References Cited in the file of this patent

UNITED STATES PATENTS

| 1,529,702 | Howell | Mar. 17, 1925 |
| 2,093,416 | Case | Sept. 21, 1937 |
| 2,581,085 | Edelman | Jan. 1, 1952 |
| 2,739,939 | Leslie | Mar. 27, 1956 |
| 2,864,981 | De Giers | Dec. 16, 1958 |
| 2,885,118 | Remke | May 5, 1959 |

FOREIGN PATENTS

| 796,806 | Great Britain | Mar. 13, 1957 |